United States Patent [19]

Check et al.

[11] Patent Number: 4,814,573
[45] Date of Patent: Mar. 21, 1989

[54] ELECTRICAL DISCHARGE MACHINING APPARATUS WITH EXCHANGEABLE ELECTRODE REFEED CARTRIDGE

[75] Inventors: John M. Check, Chelsea; William L. Clayton, Jr., Fowlerville; Frederick L. Fitts, Ann Arbor; Thomas D. Walser, Chesaning, all of Mich.

[73] Assignee: Ex-Cell-O Corporation, Walled Lake, Mich.

[21] Appl. No.: 848,512

[22] Filed: Apr. 7, 1986

[51] Int. Cl.⁴ .............................................. B23H 7/26
[52] U.S. Cl. .................................... 219/69 E; 29/568; 204/297 R; 408/35
[58] Field of Search ..................... 219/68, 69 R, 69 E; 29/568, 26 A; 408/44, 35; 204/224 M, 286, 297 R; 51/362, 364, 430

[56] References Cited

U.S. PATENT DOCUMENTS

| | | | |
|---|---|---|---|
| 3,521,021 | 7/1970 | Ullmann et al. | 219/69 R |
| 3,639,225 | 2/1972 | Malkowski et al. | 204/297 R |
| 4,204,303 | 5/1980 | Eidam | 408/35 |
| 4,459,190 | 7/1984 | Inoue | 29/26 A |
| 4,563,800 | 1/1986 | Bonga | 219/69 R |
| 4,581,810 | 4/1986 | Kawakami et al. | 29/568 |
| 4,622,734 | 11/1986 | Kölbin et al. | 408/35 |
| 4,633,053 | 12/1986 | Puthran | 219/69 R |

FOREIGN PATENT DOCUMENTS

| | | | |
|---|---|---|---|
| 15096 | 9/1980 | European Pat. Off. | 269/8 |
| 111633 | 6/1984 | European Pat. Off. | 219/69 E |
| 2915265 | 10/1980 | Fed. Rep. of Germany | 219/69 E |
| 52-41977 | 3/1977 | Japan | 408/44 |
| 2163380A | 2/1986 | United Kingdom | 219/69 E |

Primary Examiner—M. H. Paschall
Assistant Examiner—Geoffrey S. Evans
Attorney, Agent, or Firm—John C. Evans

[57] ABSTRACT

An electrical discharge machine including a pick-and-place system for transferring electrode refeed cartridges from a storage turret to an EDM work station from either one or two indexable turrets. A plurality of equally spaced electrode cartridge assemblies are each removably mounted on each turret by magnets and guide pins. A slide assembly is vertically positioned between a cartridge assembly load and unload elevation and an EDM work station elevation. The slide assembly includes a movable connector plug assembly selectively driven by an EDM cylinder fixed on the slide assembly. The connector plug assembly supplies refeed cylinders on a slide mounted cartridge assembly and vertically reciprocates a power connector receptacle and drive head on such cartridge assembly. The receptacle and drive head include an electrode guide board guiding one or more electrodes with respect to a workpiece. The slide-mounted, fixed EDM cylinder moves the drive head to position such electrodes toward and away from the workpieces to spark erode desired openings therein. The connector plug assembly and receptacle cooperate to disconnect and connect the respective electrode cartridge assemblies with respect to the drive unit and with respect to a source of air and electricity operative to sense when the respective electrodes become worn and to refeed electrodes to compensate for electrode wear.

21 Claims, 18 Drawing Sheets

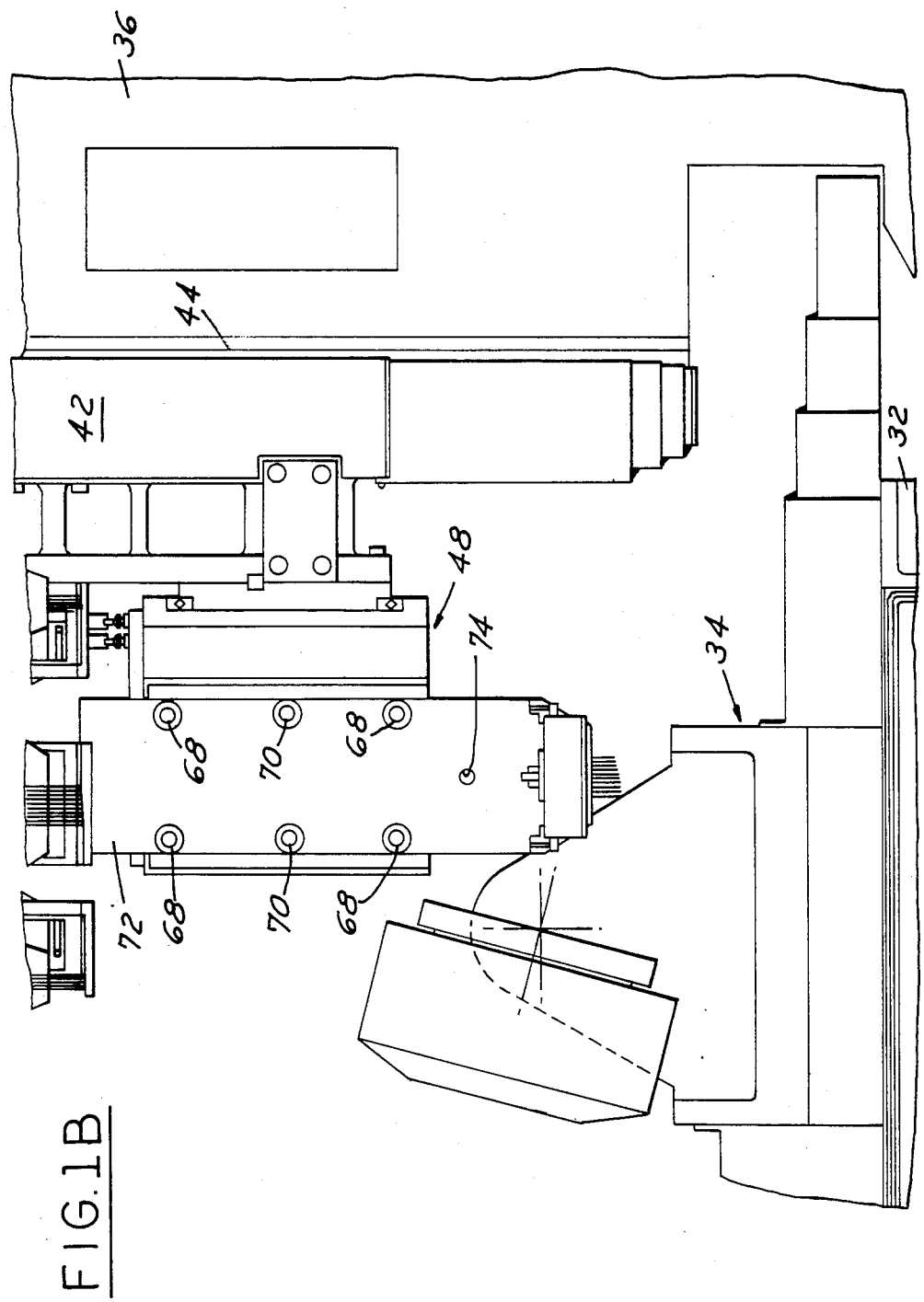

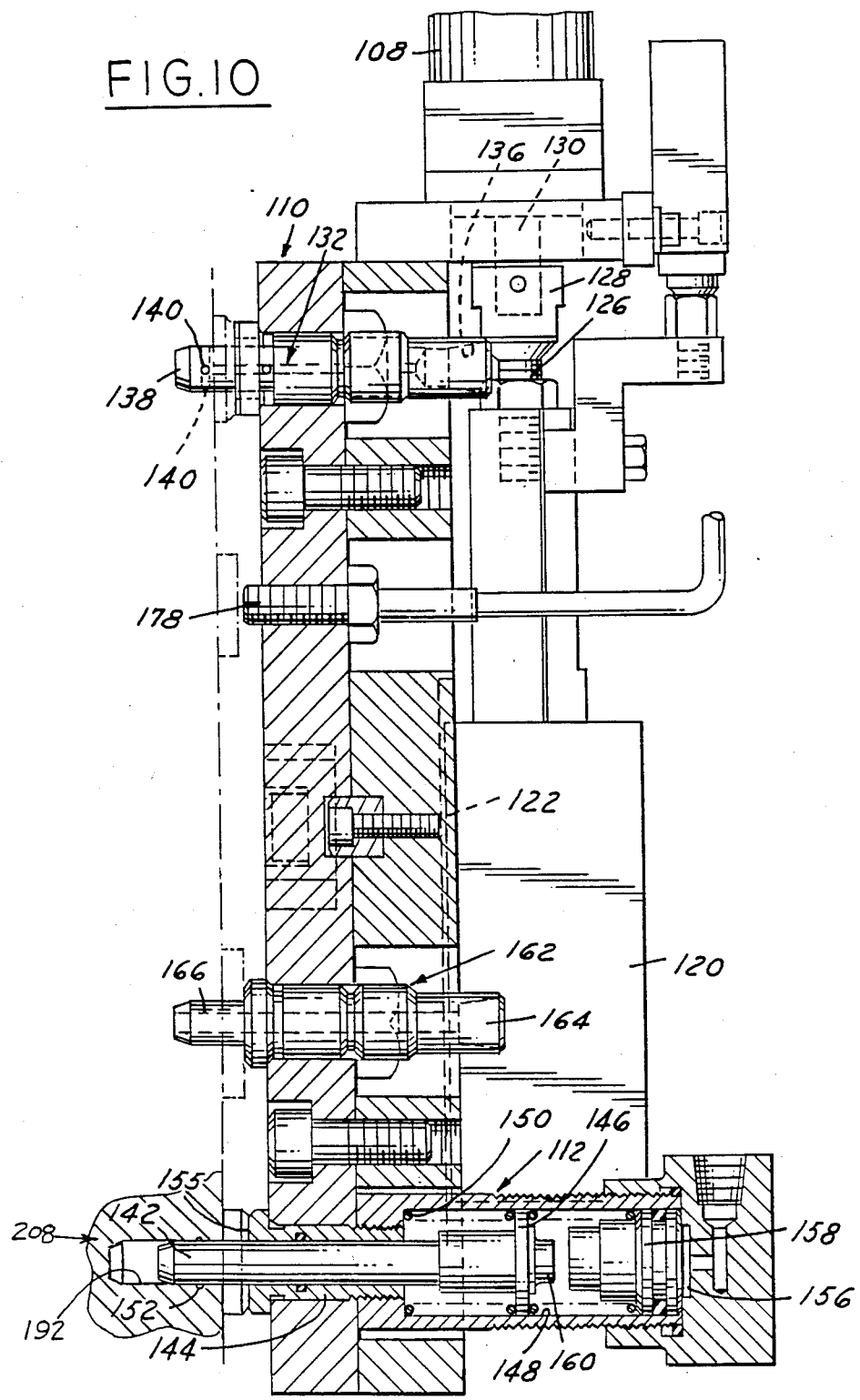

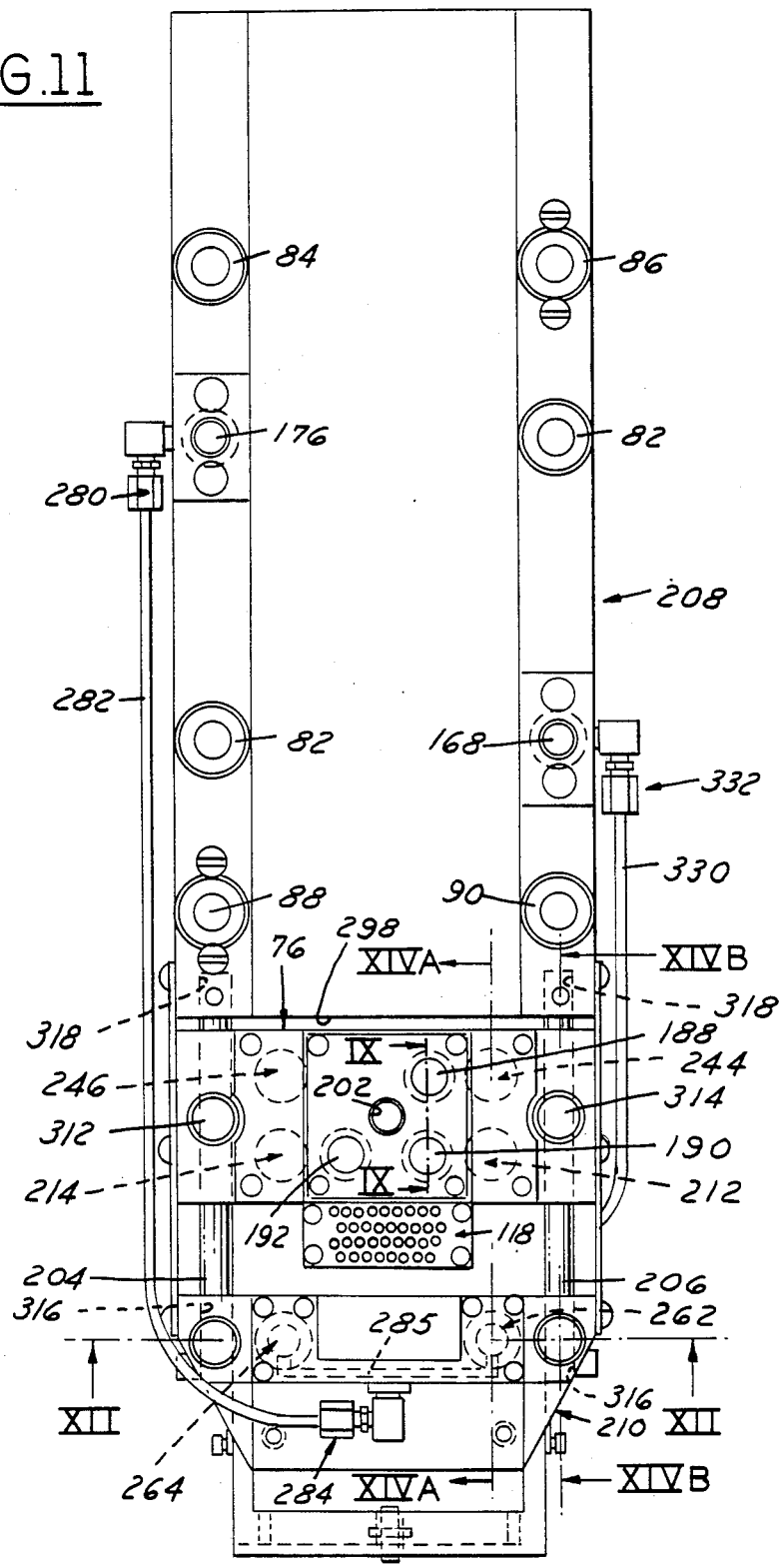

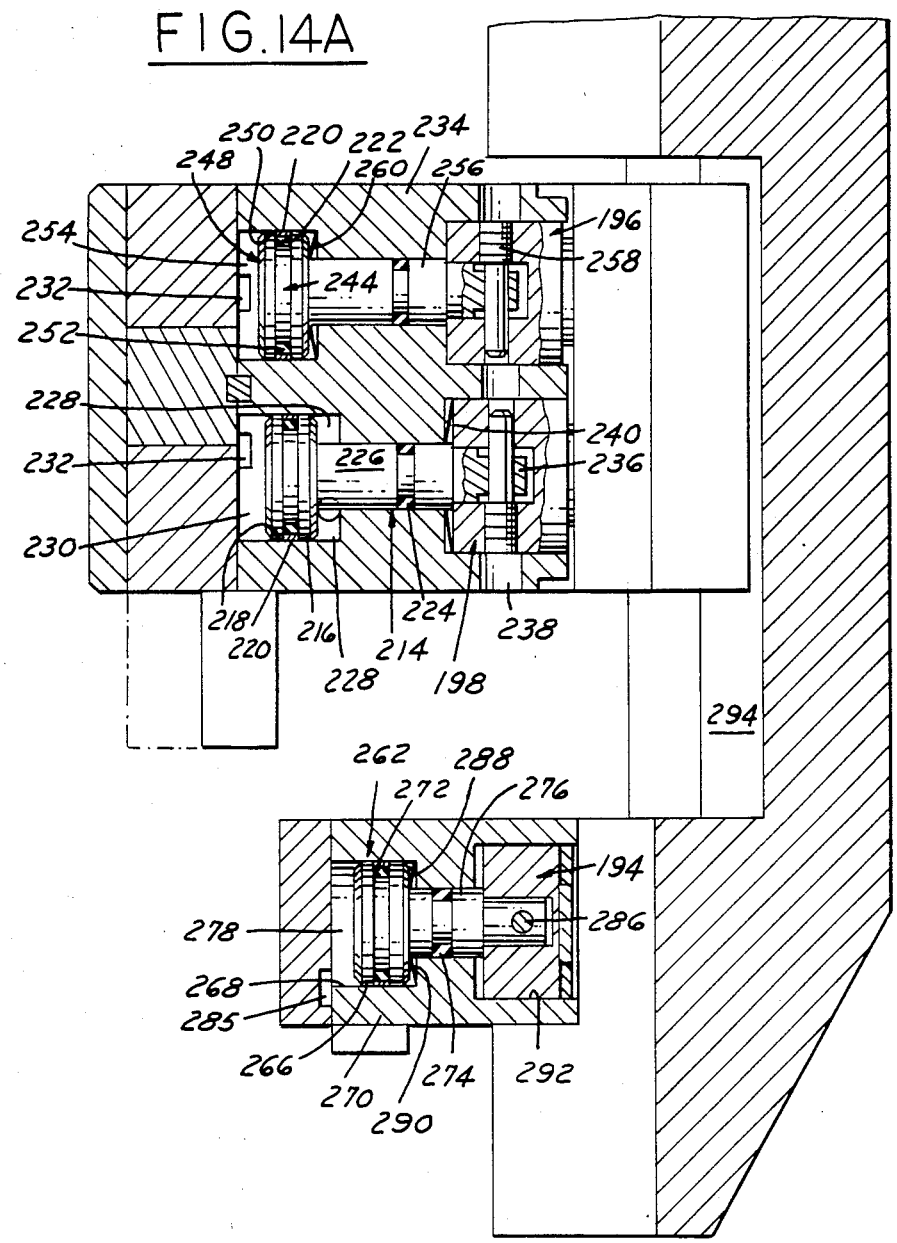

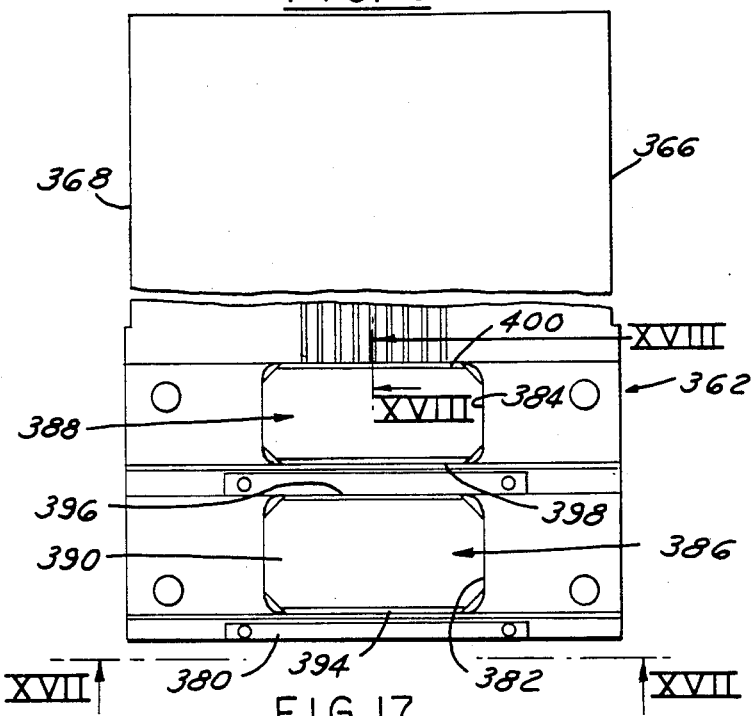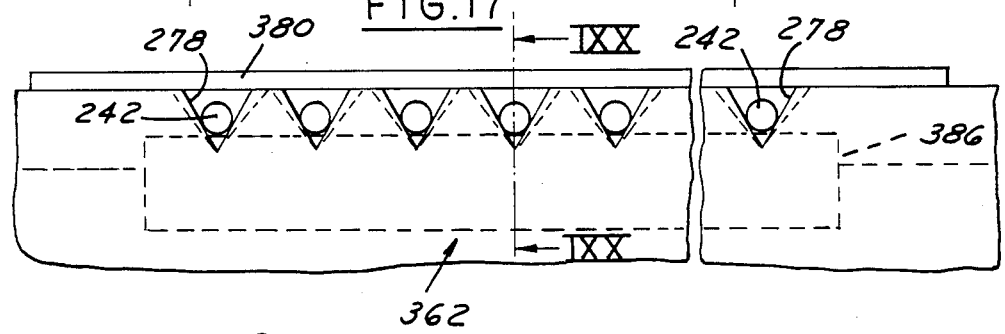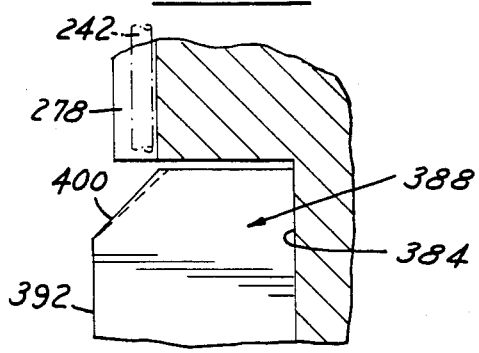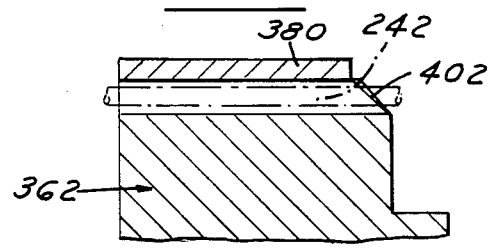

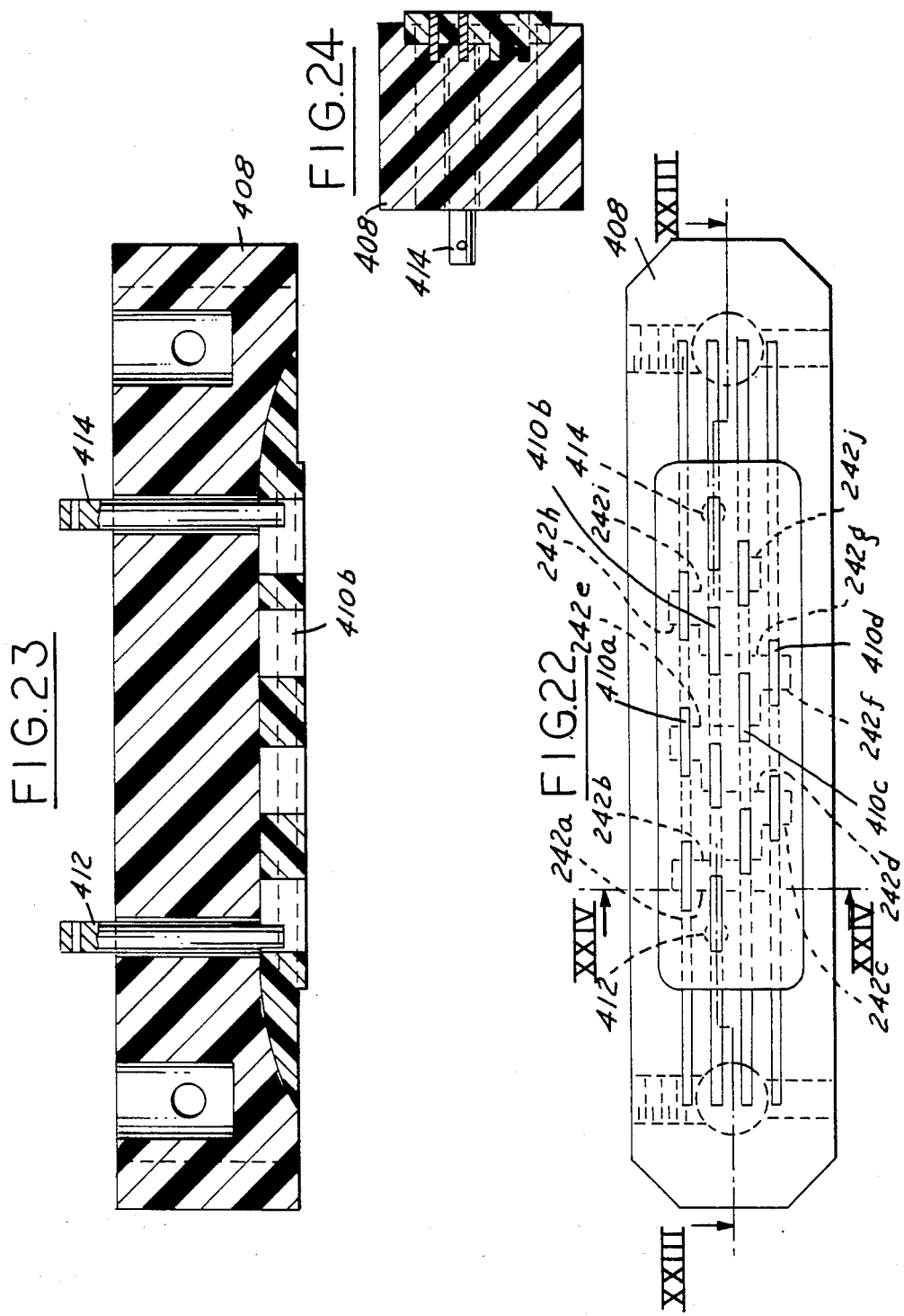

ELECTRICAL DISCHARGE MACHINING APPARATUS WITH EXCHANGEABLE ELECTRODE REFEED CARTRIDGE

TECHNICAL FIELD

This invention relates generally to electrical discharge machines and, more particularly, to such machines including refeed electrode cartridge assemblies transferable from a turret to an EDM operating station.

BACKGROUND ART

Heretofore, electrical discharge machines have typically included a servo driven head mounted thereon for guided movement in a vertical direction, with either a single electrode or a pair of like or different electrodes removably mounted via suitable quick change means on the driven head. An example of such a machine is set forth in U.S. Pat. No. 4,316,071 issued Feb. 16, 1982 to Bonga for Tool Changer. Other EDM machines have included a series of individual electrodes at different locations on a rotatable turret supported in turn by a servo driven head; an example of such a turret is shown in U.S. Pat. No. 4,459,410 issued July 10, 1984 to Inoue for a Method of and Apparatus for Machining a 3-0 cavity in a workpiece. While such arrangements are satisfactory, they do not incorporate means for mounting and indexing refeed type cartridge assemblies in order to permit flexible interchange of cartridges with different electrode types.

DISCLOSURE OF THE INVENTION

Accordingly, a general object of the invention is to provide an improved electrical discharge machining apparatus having means for quickly providing electrodes of different types without having to interrupt machine operation.

Another object of the invention is to provide an electrical discharge machine having a pick-and-place shuttle incorporated thereon moveable with respect to a rotatable turret carrying a plurality of electrode cartridge assemblies and operable to exchange refeed cartridges during machine operation.

A further object of the invention is to provide an electrical discharge machine including rotatable turrets having an array of guide pins and magnetics to releasably secure a plurality of electrode refeed cartridges for transfer to a pick-and-place machine shuttle.

Yet another object is to provide a refeed cartridge assembly having a combined power receptacle and drive head adaptable either for association with any one of the preceding EDM machines or for association with EDM machines generally and operative to supply actuation fluid to refeed cartridge clamp cylinders and to connect the electrodes carried in the cartridge assemblies to an EDM power source.

Still another object of the present invention is to provide such a combined power receptacle and drive head with a cartridge-carrying board cantilevered thereon that reciprocates without frictional engagement with other cartridge components during either servo drive of electrodes carried by the board or during refeed of electrodes with respect to the board to compensate for electrode wear.

Yet another object of the present invention is to provide, in conjunction with the combined receptacle and drive head, an electrode bridge that defines separate electrical paths, in part bridging electrode support recesses in the cartridge; the bridge being selectively positioned to determine the presence of electrodes.

Another object of the present invention is to provide an improved plug assembly on a pick-and-place shuttle of the preceding objects including an improved lock-pin for locking a cartridge on the slide shuttle during machine operation and operable to release a slide shuttle supported refeed cartridge for transfer to an open station on a turret.

Still another object is to provide a plug assembly of the preceding object which is carried on slides on the slide shuttle and which is coupled to an EDM drive cylinder fixed to the slide shuttle to reciprocate the plug assembly which in turn constitutes the sole drive for a combined receptacle and drive head of a refeed cartridge and wherein the refeed cartridge includes clamp means supplied by the receptacle to condition the electrodes to be advanced by the EDM drive cylinder during the EDM operation.

Still another object of the invention is to provide an electrical discharge machine including a frame having secured thereon a workpiece holding fixture; a support member slidably mounted on the frame for movement on a Z axis; a turret indexably mounted on the frame; a plurality of equally spaced electrode refeed cartridge assemblies removably mounted on the turret by magnets, each of the cartridge assemblies including a combined power receptacle and drive head for moving one or more electrodes extending therefrom to a workpiece to spark erode a desired opening therin; and coupling means for disconnecting and connecting the respective cartridge assemblies with respect to a slide shuttle for exchanging cartridges during machine operation, the shuttle having an EDM drive means and air and electrical fittings/plugs.

These and other objects and advantages will be apparent from the following description and accompanying drawings.

BRIEF DESCRIPTION OF THE DRAWINGS

FIG. 1B is a lower side elevational view of the FIG. 1 structure;

FIG. 10 is a vertical sectional view taken along the line 10—10 of FIG. 7 looking in the direction of the arrows;

FIG. 11 is a front elevational view of a refeed cartridge in accordance with the present invention;

FIG. 14A is an enlarged fragmentary sectional view taken along the line 14A—14A of FIG. 11 looking in the direction of the arrows;

FIG. 16 is a fragmentary elevational view of the electrode cartridge board;

FIG. 17 is an enlarged fragmentary end elevational view taken along the line 17—17 of FIG. 16;

FIG. 18 is an enlarged fragmentary sectional view taken along the line 18—18 of FIG. 16;

FIG. 19 is an enlarged fragmentary sectional view taken along the line 19—19 of FIG. 17;

FIG. 22 is a bottom elevational view of an electrode short block in FIG. 15;

FIG. 23 is a sectional view taken along the line 23—23 of FIG. 22; and

FIG. 24 is a sectional view taken along the line 24—24 of FIG. 22.

BEST MODE OF CARRYING OUT THE INVENTION

Figure 1A:
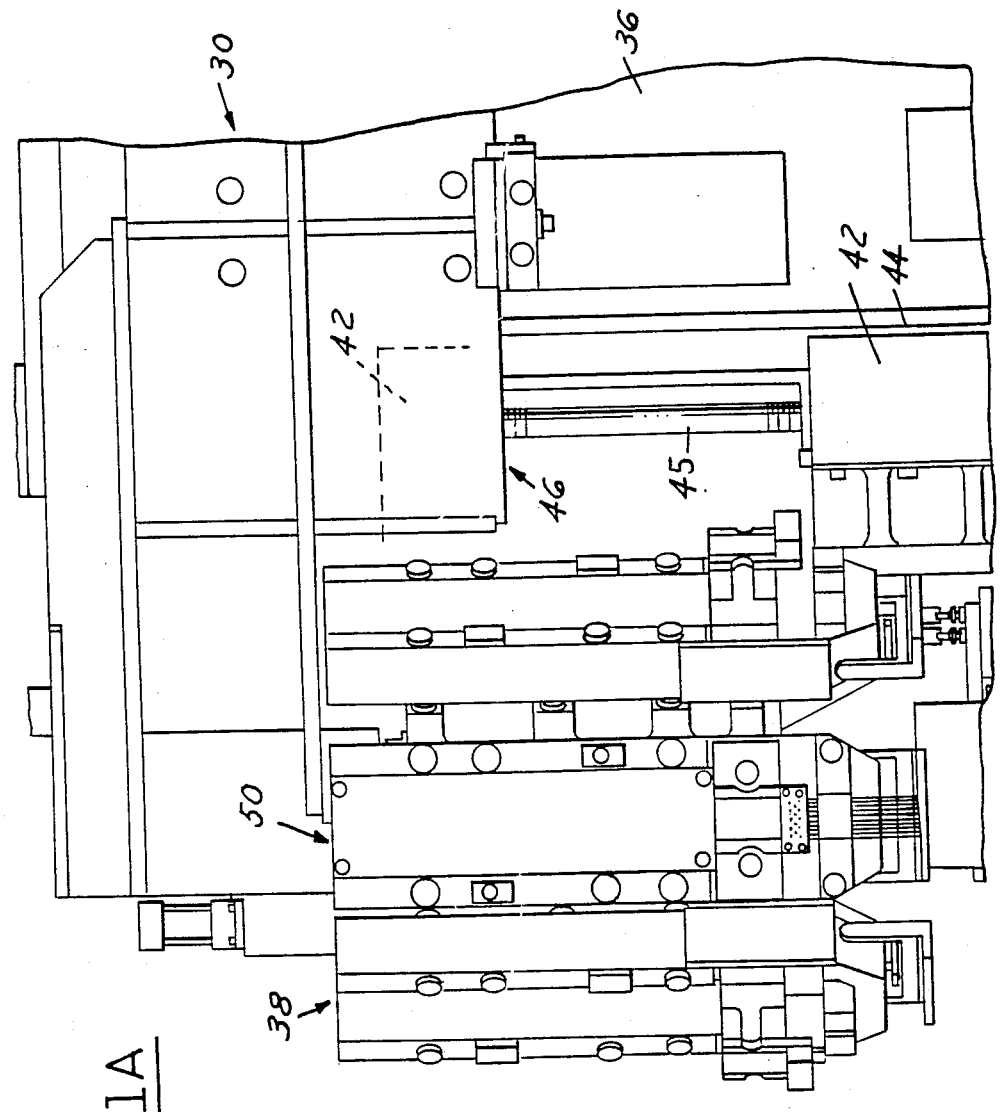
FIG. 1A is an upper side elevational view of a machine embodying the invention.

Referring now to the drawings in greater detail, FIGS. 1A and 1B illustrate generally an electrical discharge machine 30 including a base frame 32 having a suitable workpiece holding fixture 34. An upright frame member 36 is secured on base frame 32 along with a control panel, not shown, but which may be mounted on the base frame 32 or on an upright frame member 36. A pair of indexable turrets 38 and 40 are each rotatably mounted on a support frame 41 extending forwardly of the frame member 36 on oppositely disposed sides thereof.

A support member 42 is slidably mounted on a Z-axis track 44 on the upright frame member 36. The support member 42 is connected to a drive rod 45 of a servo-driven head 46. A shuttle slide assembly 48 is carried by the support member 42 to be driven by the head 46 between a first raised position at a cartridge exchange elevation shown by broken lines in FIG. 1A and a second position at a lower EDM working elevation shown in FIG. 1B.

Figure 4:
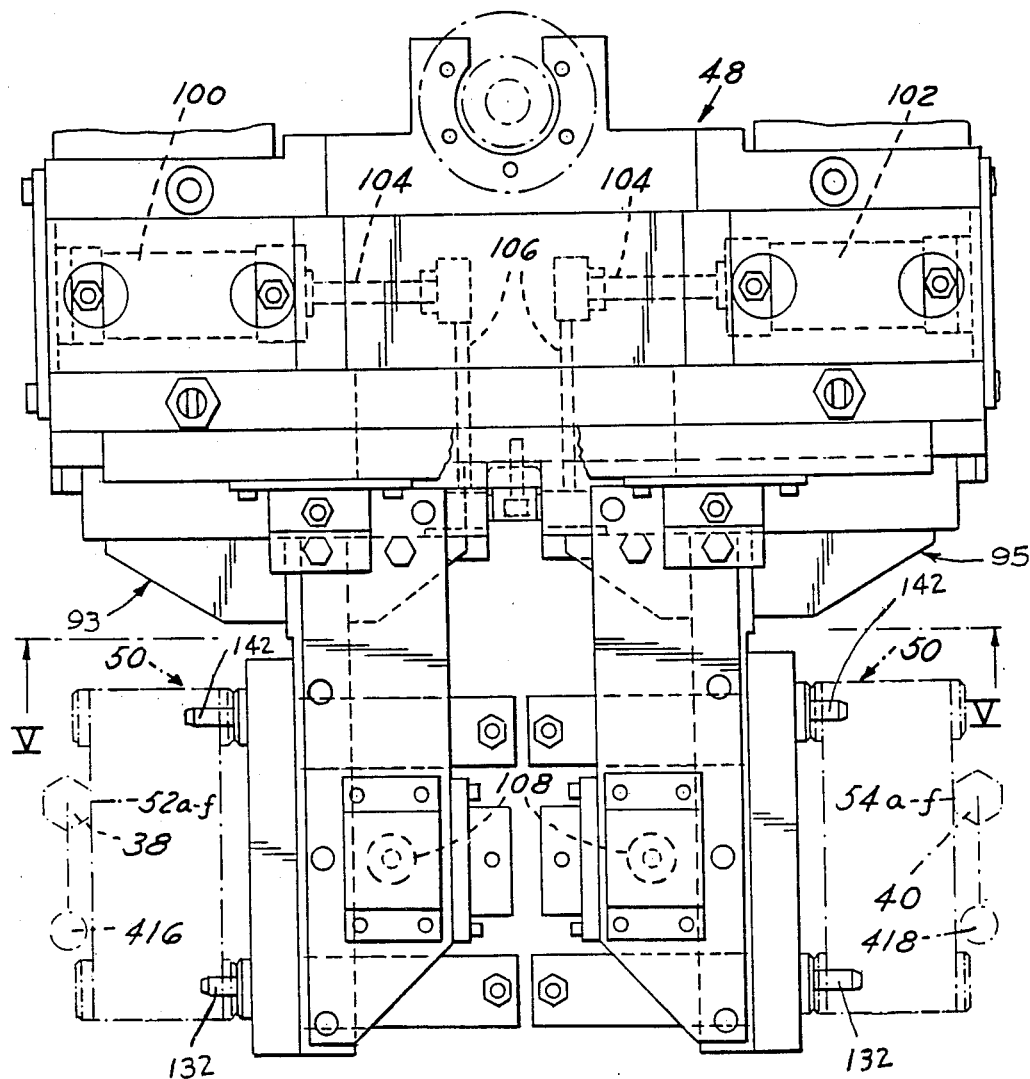
FIG. 4 is a top elevational view taken viewed along the line 4—4 of FIG. 3 and looking in the direction of the arrows.
Figure 5:
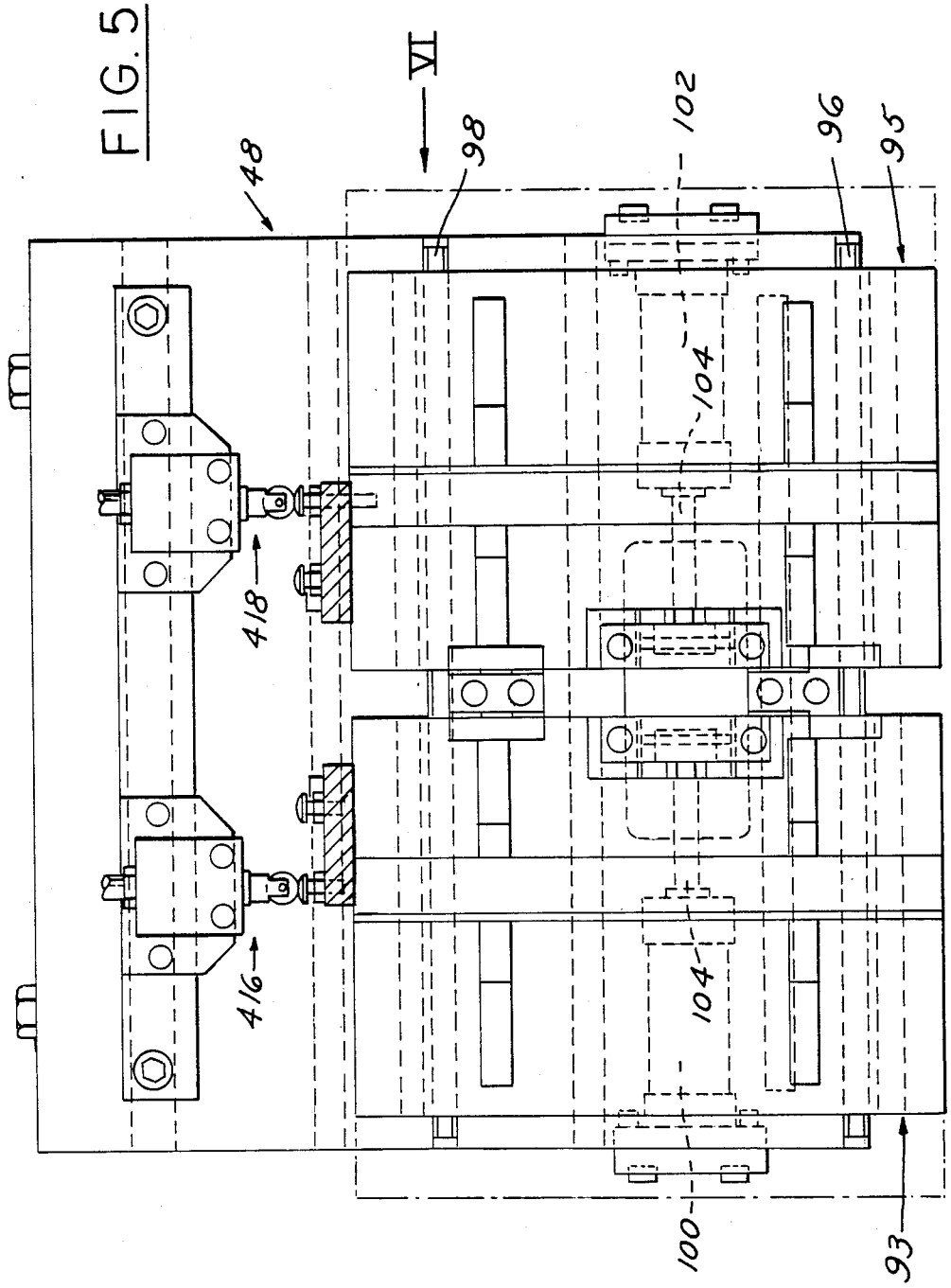
FIG. 5 is a sectional view taken along the line 5—5 of FIG. 4 looking in the direction of the arrows.
Figure 6:
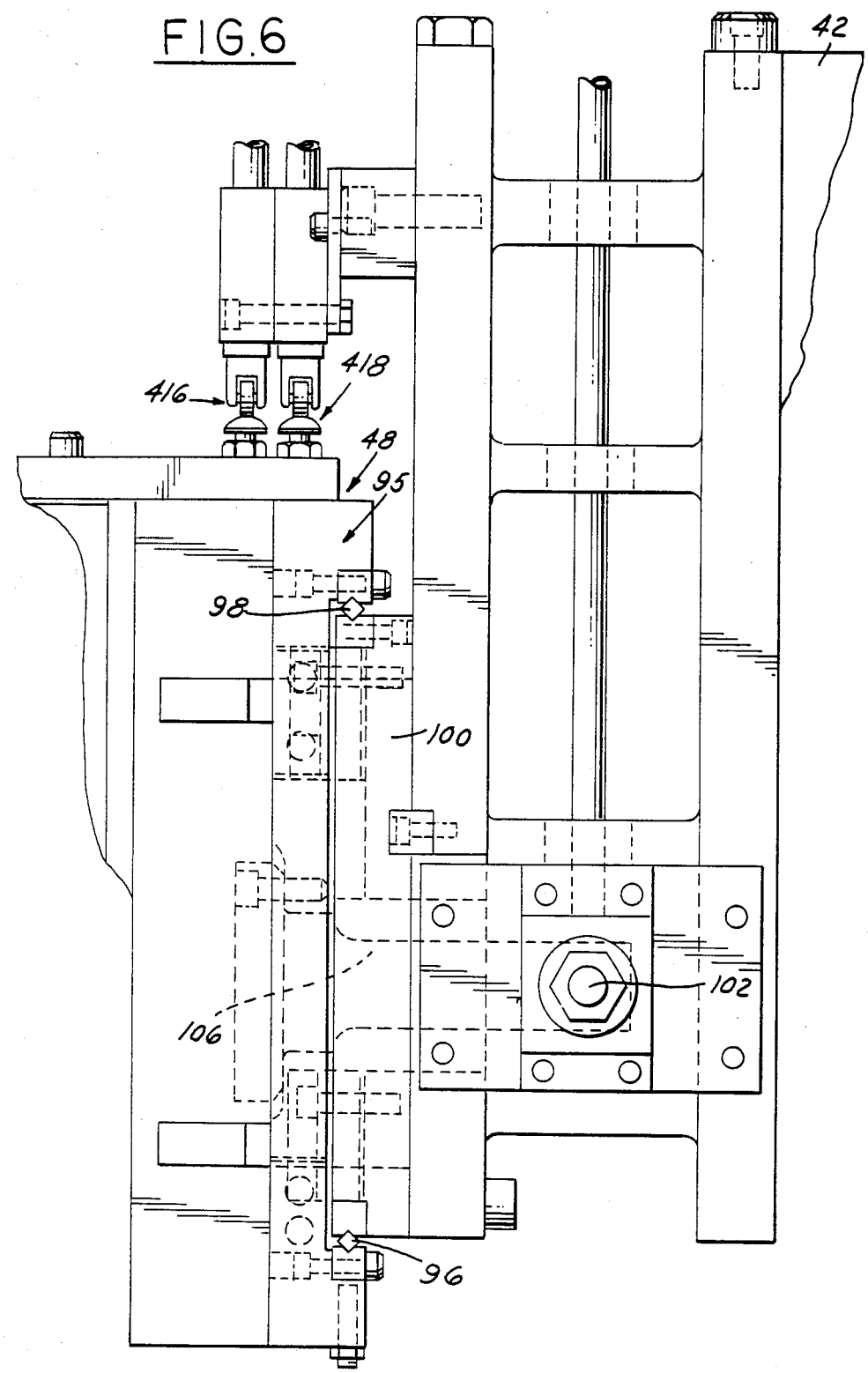
FIG. 6 is a fragmentary end view looking in the direction of the arrow 6 in FIG. 5.

The shuttle slide assembly 48 is located between the turrets 38, 40 as shown in FIG. 4. Assembly 48 is slidably mounted on the support member 42 to move transversely of the support member to transfer a preselected refeed cartridge assembly 50 from or to one or the other of the turrets 38, 40.

One aspect of the present invention is the provision of an indexable turret which has a plurality of cartridge support positions, diagrammatically shown as support stations 52a-f on turret 38 and support stations 54a-f on turret 40.

Each support station 52a-f and 54a-f is defined by a plurality of axially spaced ribs 56a-d extending from a turret hub 58. The front face of rib 56a carries a pair of locator pins 60. The front face of rib 56b carries a pair of magnets 62. The front face of rib 56c carries a pair of locator pins 64 and the front face of rib 56d carries a drive head lock pin 66 centered thereon.

Figure 2:
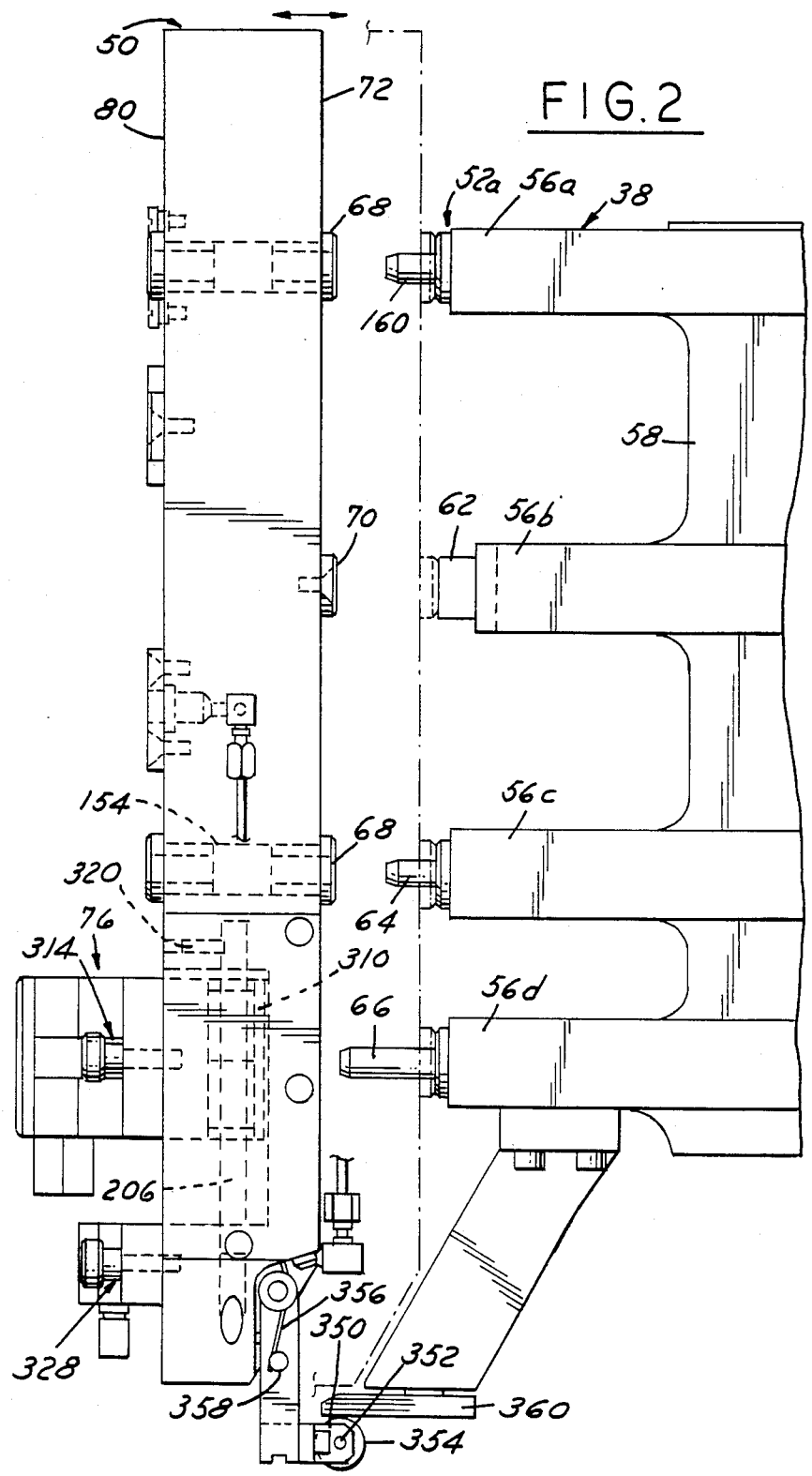
FIG. 2 is an enlarged side elevational view of a portion of the FIG. 1A structure.

The locator pins and magnets at each turret support station coact with lock bushings 68 and magnets 70 on a support surface 72 on each refeed cartridge 50. These features are best shown in FIGS. 1B and 2. In FIG. 2 the refeed cartridge is shown in spaced and facing relationship to the turrets 38. Also, each refeed cartridge 50 has a hole 74 in surface 72 that extends through the cartridge to the opposite face thereof where the drive head lock pin 66 engages a combination receptacle and drive head assembly 76 of the cartridge.

In FIG. 2, the refeed cartridge is shown released from the illustrated support station. As can be seen, cross-travel to the dotted line position causes tapered ends 78 on each locator pin 62 to position a cartridge on the turret for releasable interlock at the magnets 62, 70 shown joined in FIG. 2.

The outboard facing surface 80 on each cartridge 50 is indexed by its supporting turret into axial alignment with the shuttle slide assembly 48 when the support member 42 is in its raised Z-slide position.

The outboard facing surface 80, as shown in FIGS. 1A and 11, has a pair of proximity switch sensor plates 82 and includes lock bushings 84, 86, 88, 90. It also includes the lock bushings 92 (as shown in FIG. 10) which cooperate with pin lock assemblies 112 on the shuttle slide assembly 48 (shown opposite hand in FIG. 7) for mechanically coupling a refeed cartridge 50 on the shuttle slide assembly 48 for transfer to and location at an EDM work station to be described. The pin lock assemblies 112 include features to be described which positively lock a refeed cartridge in place during an EDM operation. When the refeed cartridge is properly placed, sensors 82 will operate switch means to condition a suitable power supply for EDM operation.

Figure 3:
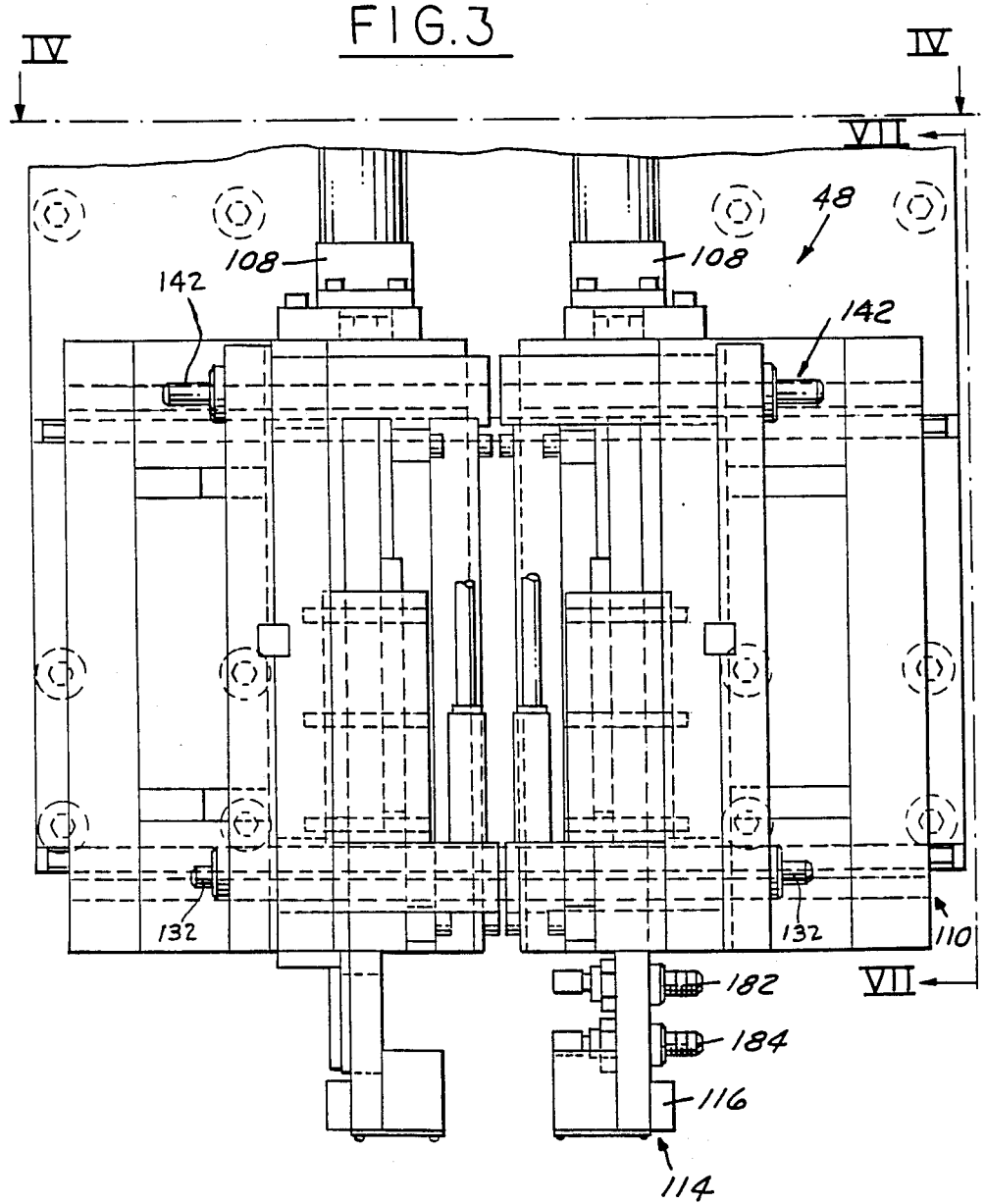
FIG. 3 is an enlarged front elevational view of a portion of the FIG. 1B structure.

The shuttle slide assembly 48 is more particularly illustrated in FIGS. 3-6. It includes a pair of slides 93, 95, each supported on slide bearings 96, 98 carried by a support plate 100 which is fixedly connected to support member 42 for travel on the Z-axis. Cross-travel of each of the slides 92, 94 between the turrets and vertical alignment with an EDM work station is provided by a pair of spaced pneumatic cylinders 100, 102. As shown in FIG. 3, each cylinder 100, 102 has its rod 104 connected to a member 106, in turn fixedly secured to one of the slides 92, 94.

Each slide 92, 94 carries an EDM drive cylinder 108 that has its housing fixed to the slide. Each of the slides 92, 94 also carries a fixed plug board 110 for supplying electrical power and fluid power to a refeed cartridge 50 supported thereon. Furthermore, each of the plug boards 110 includes a pair of lock pin assemblies 112, one of which is shown in section in FIG. 10.

Electric power is provided by a moveable plug 114 defining a multiple female electrical terminal block 116 that is selectively connected to a complementary male terminal block 118 on the receptacle and drive head 76 of a refeed cartridge 50 (FIG. 11) when it is supported on the slide for EDM operation.

Figure 8:
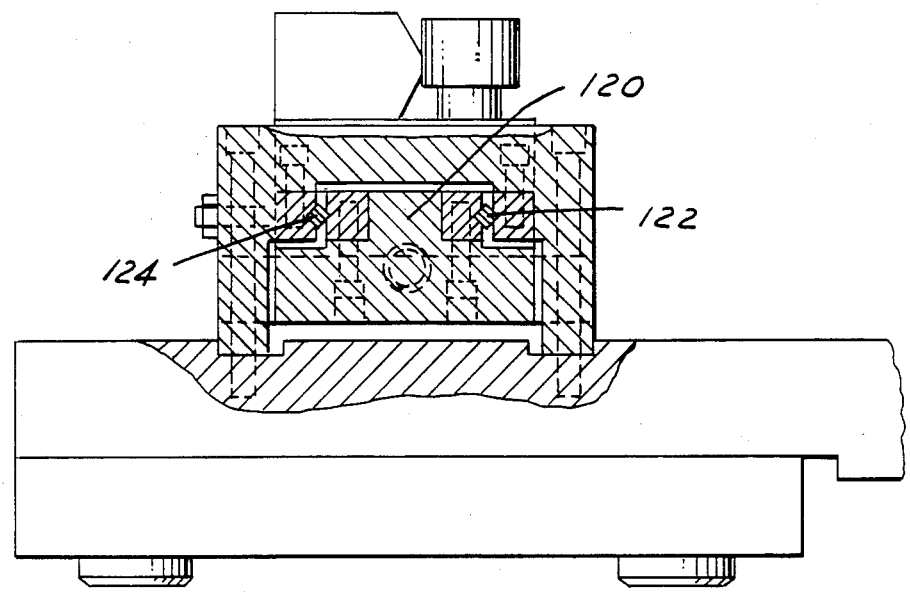
FIG. 8 is a horizontal sectional view taken along the line 8—8 of FIG. 7 looking in the direction of the arrows.
Figure 9:
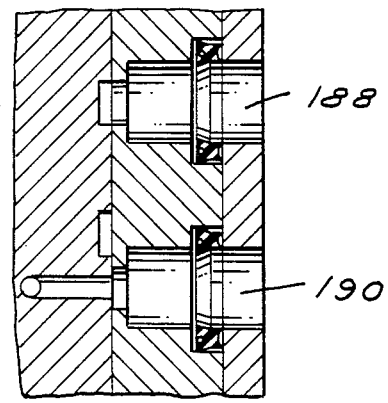
FIG. 9 is a frequentary sectional view taken along the line 9—9 of FIG. 7 looking in the direction of the arrows.
Figure 13:
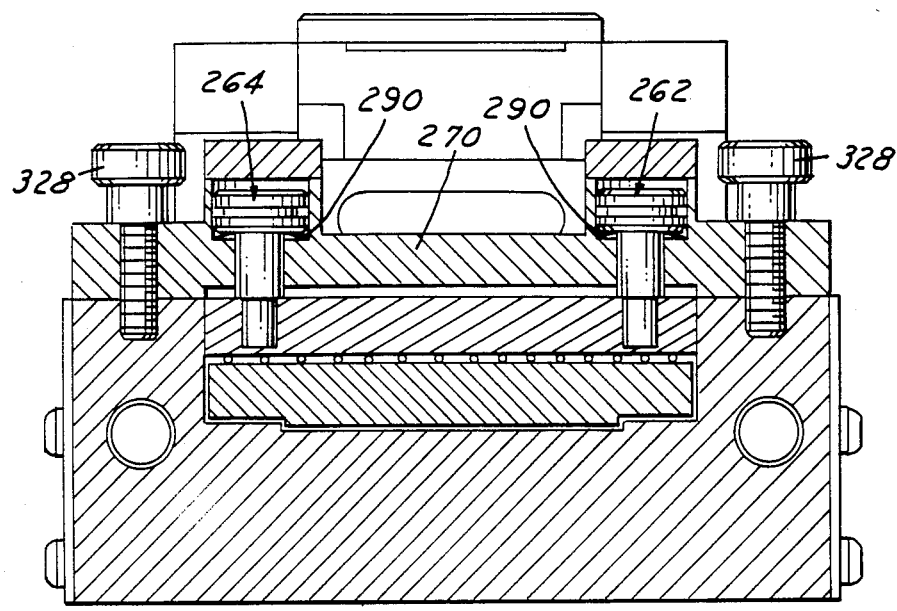
FIG. 13 is an enlarged, fragmentary rear elevational view of the refeed cartridge of FIG. 11.

The moveable plug 114 is carried at the base of a carriage 120 shown in FIGS. 8 and 10. Carriage 120 is supported in slide bearing assemblies 122, 124, disposed in spaced parallelism on the plug board 110. The carriage 120 has a drive rod 126 connected by a clevis 128 to the cylinder rod 130 of EDM drive cylinder 108.

Figure 7:
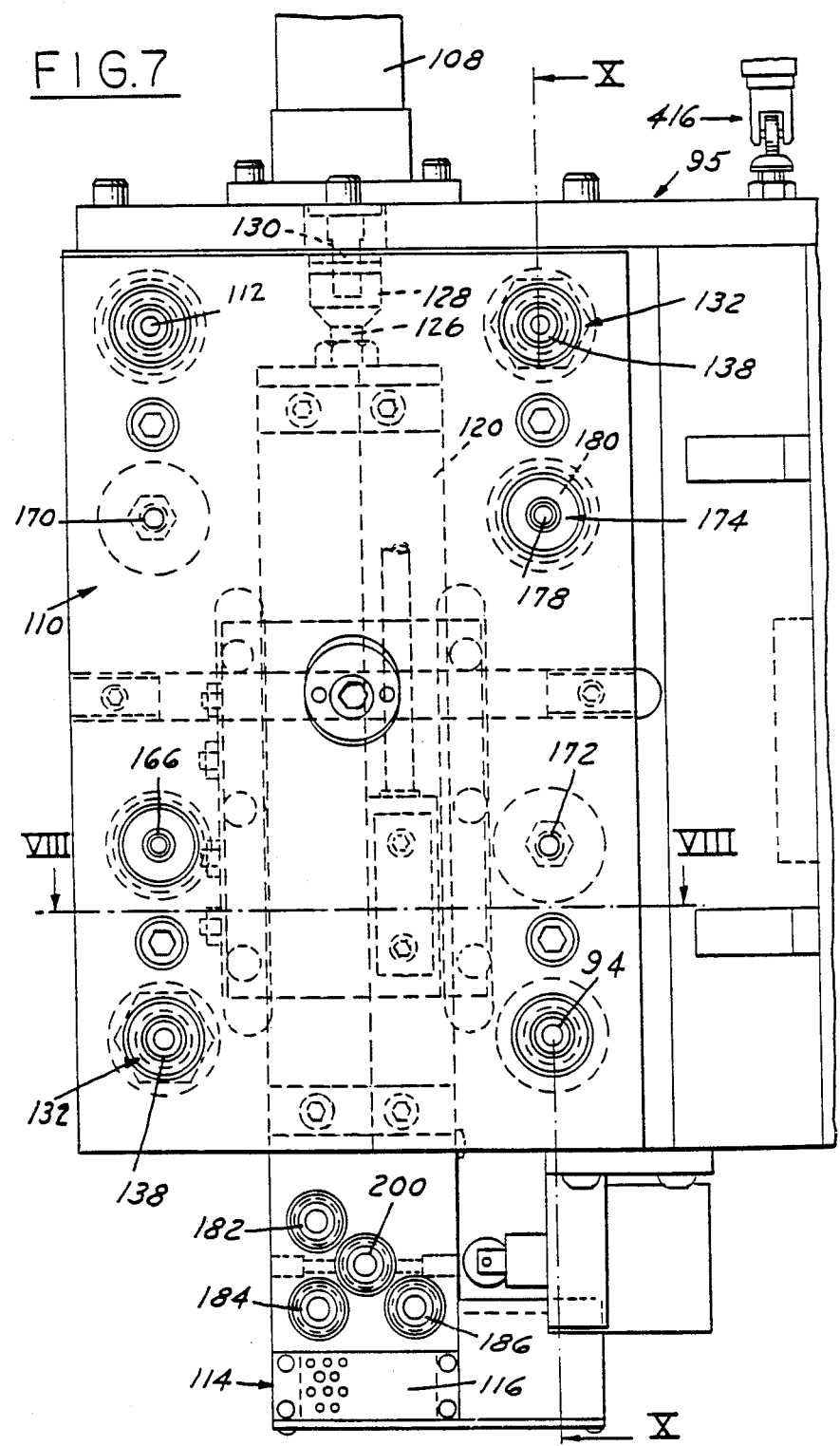
FIG. 7 is an end view of FIG. 4 looking in the direction of the arrow 7.

As shown in FIGS. 7 and 10, the plug board 110 further includes connector fittings 132, 134, each having a threaded inlet 136 adapted to be connected to a source of air. An air blast connector pin 138 has cross ports 140 therein through which air is selectively directed as a cartridge is transferred from a turret to the shuttle slide thereby to clean lock bushings 86, 88 to assure unobstructed seating of a refeed cartridge 50 on the plug assembly 110. To further secure the refeed cartridge 50 in place, each of the lock pin assemblies 112 includes a lock pin 142 that is slidably received in a seal bushing 144. The pin 142 has a piston head 146 slidably received in a bore 148. The head 146 is biased in a direction inwardly of the plug assembly 110 by a spring 150 so as to cause retractable lock balls 152 on the pin 142 to engage an internal shoulder 154 (shown in FIG. 2) on cartridge 50 to draw it securely against the outboard reference surface 155 of the plug assembly 110. In order to release the balls 152, a release cylinder 156 is communicated with a pressure source to cause a release piston 158 to engage a head portion 160 of release mechanism (not shown) located internal of pin 142 and operative to cause the lock balls 152 to move inwardly of the O.D. of the lock pin 142 so as to release the cartridge for transfer to a turret.

The plug assembly 110 further includes a double-ended dielectric fitting 162 with an inboard end 164 adapted to be connected to a source of dielectric fluid and a tapered outboard end 166 that is received into a sealed relationship with a dielectric port 168 on a cartridge 50. Proximity switches 170, 172 on the plug assembly are provided to sense proper positioning of a cartridge 50 on the shuttle slide assembly by movement of proximity switch targets 82 thereon adjacent the switches 170, 172. Dielectric fitting 17A joins to dielectric port 176 on cartridge 50. It has a tapered end 178 and inboard end 180.

The moveable plug 114 in addition to carrying the male terminal block 118 also has three air fittings 182, 184, 186 each with a tapered outboard end and with an inboard end adapted to be selectively connected to the air pressurized air source to electrode feed and refeed operations to be described. The air fittings 182, 184, 186 have complementary sealed air ports 188, 190, 192 on the receptacle and drive head 76 to supply air to various clamp assemblies thereon for positioning electrode bridges 194, 196 and 198 (FIG. 14a), all to be described.

In accordance with certain other aspects of the present invention, the refeed cartridge 50 is driven through the moveable plug assembly 114 by the EDM drive servo to feed electrodes with respect to the workpiece when the shuttle and slide assembly and a cartridge supported thereon is in a down Z-axis position shown in FIG. 1B.

The moveable plug 114 carries a drive pin 200 that is seated in a bore 202 of the receptacle and drive head assembly 76. Consequently, reciprocation of the moveable plug 114 by the EDM drive cylinder 108 is directly transferred to head assembly 76.

In accordance with the invention, the head assembly 76 is slidably supported on spaced slide rods 204, 206 having their opposite ends connected, respectively, to a cartridge frame 208 and to an electrode guide plate 210.

Figure 12:
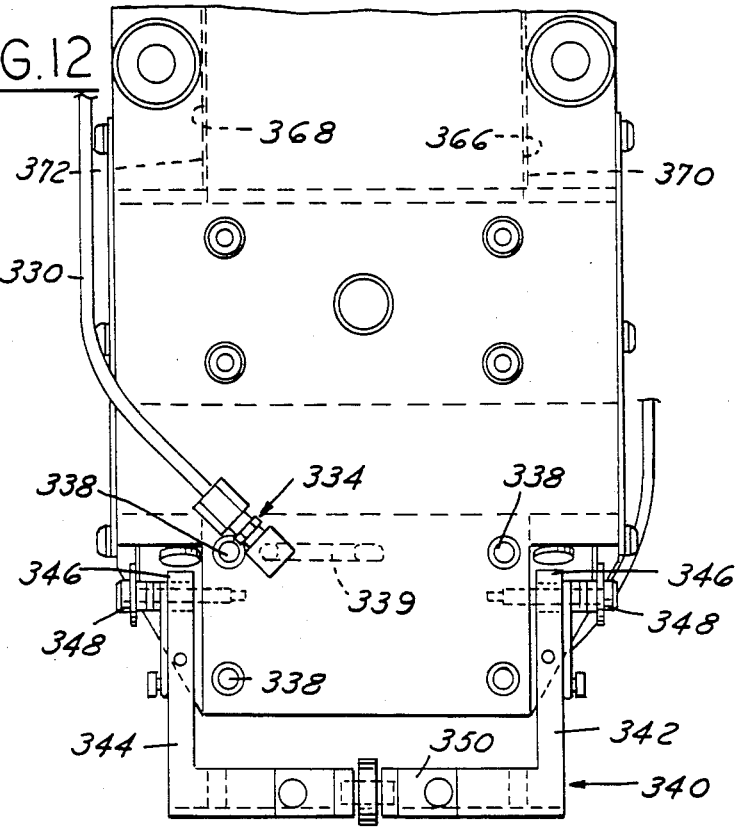
FIG. 12 is an enlarged sectional view taken along the line 12—12 of FIG. 11 looking in the direction of the arrows.

The aforedescribed receptacle and drive head assembly 76 has spaced clamp assemblies 212, 214 for operating the clamp bridge 198. Each of the assemblies 212, 214 includes a drive piston 216 slidably disposed in a housing bore 218. An annular seal ring 220 and O-ring 222 are carried by the piston 216 and cooperate with an O-ring 224 on a piston stem 226 to seal a pressurizable chamber 228 in communication with sealed air port 188. A pressurizable chamber 230 on the other end of drive piston 216 is communicated with the sealed air port 190 via a relief groove 232 in the housing 234. Each stem 226 is connected at its distal end 236 to one end of the electrode clamp bridge 198 by a set screw 238. A wave spring 240 is disposed between housing 234 and the bridge 198 to direct a continuous drag on spaced parallel electrodes 242 (FIG. 12) during a refeed operation to be described. The clamp assemblies 212, 214 are thus operable in three distinct modes. One mode pressurizes chamber 230 during the EDM operation; another mode pressurizes chamber 228 to release the spring force on the electrodes 242 during a hitch feed so that there is no resistance on the electrodes; and a neutral mode in which pressure in the chambers 228, 230 is balanced to impose only spring force on the electrodes.

Clamp assemblies 244, 246 are also provided to operate the electrode sensing bridge 196. Each of the clamp assemblies 244, 246 includes a piston 248 slidably supported in a bore 250. A piston O-ring 252 seals a pressurizable chamber 254 in communication with the sealed air port 190 to selectively pressure the piston 248 during an electrode test operation. The piston 248 has its stem 256 connected to electrode test bridge 196 by a set screw 258. When the test is conducted, both chambers 254 are pressured to move piston 248 and its stem 256 to hold the electrode sensing bridge 196 against electrodes. Following the test, the chamber is vented and a return spring 260 located in the bore 250 below the piston biases it upwardly to space the bridge 196 from the electrodes.

Figure 15:
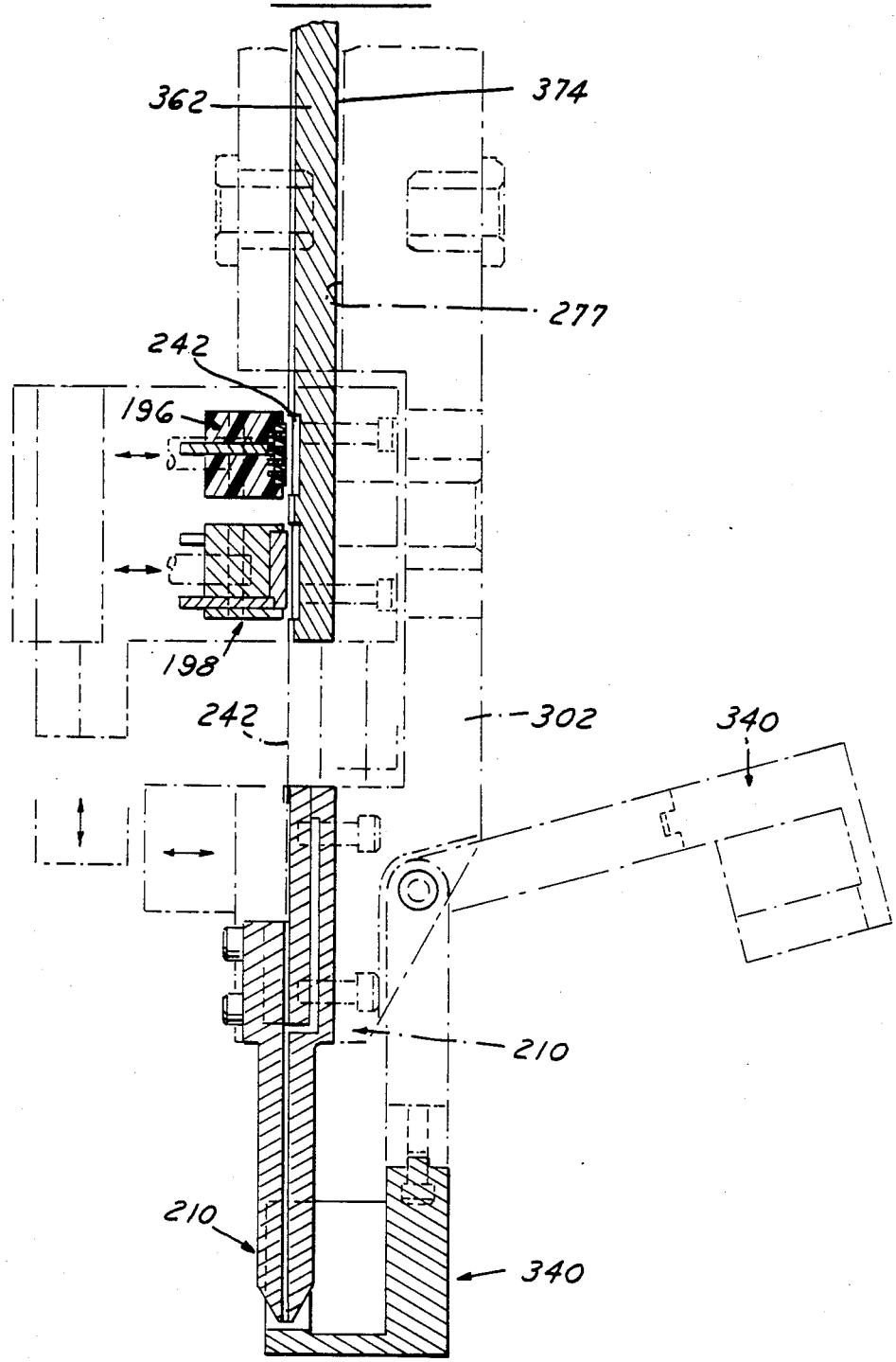
FIG. 15 is an enlarged longitudinal sectional view of an electrode cartridge board, guide and clamp assembly.

Additionally, the refeed cartridge 50, as shown in FIGS. 11 and 15, includes clamp assemblies 262, 264 on the electrode guide member 210. Each of the assemblies 262, 264 includes a piston 266 slidable in a bore 268 in a housing 270. The piston 266 carries an O-ring 272 which cooperates with an O-ring 274 on a piston stem 276 to seal a pressurizable chamber 278. The chamber 278 is communicated with the sealed air port 176 via fittings 280, conduit 282 and fittings 284 on the cartridge 50 and passages 285 in the housing 270, as best shown in FIG. 11. The stems 276 are connected by pins 286 to bridge 194 that clamps the electrodes 242 during the hitch step of a hitch refeed operation to be described. Each assembly 262, 264 has a return spring 288 located in space 290 between the housing 270 and piston 266 for releasing the electrodes when clamp assemblies are depressurized. Bridge 194 slides in slot 292 in housing 270.

Figure 14B:
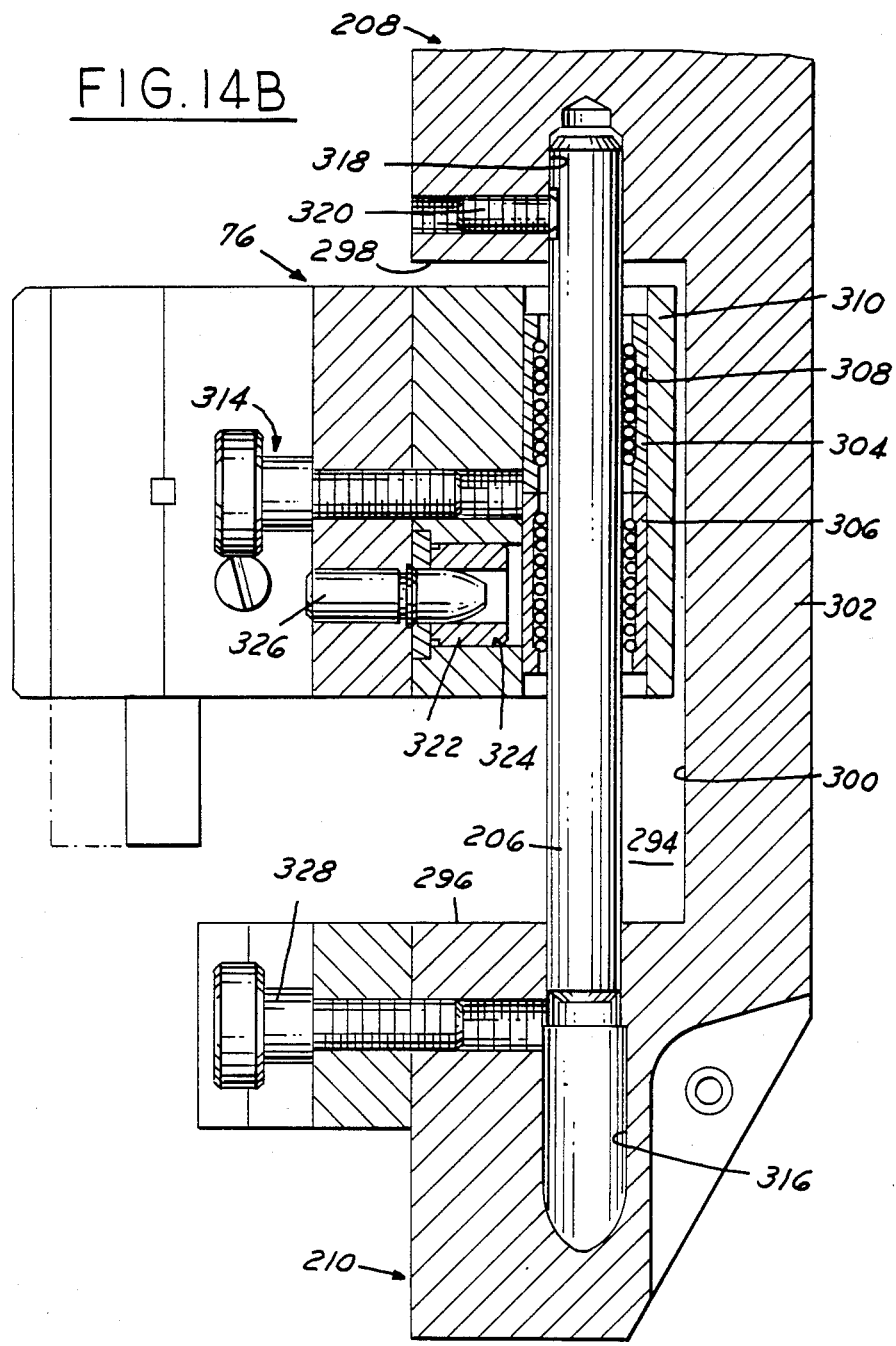
FIG. 14B is an enlarged fragmentary sectional view taken along the line 14B—14B of FIG. 11 looking in the direction of the arrows.

A feature of the present invention is the provision that both electrode feed and wear compensation movements are accomplished by a single drive head assembly 76. Further, the drive head assembly 76 reciprocates on slide rods 204, 206 within an opening 294. As shown in FIG. 14B it is defined by the inboard surface 296 of guide member 210, the inboard surface 298 of cartridge frame 208 and an undercut surface 300 on frame extension 302 to clamp housing 270. The opening 294 is dimensioned so that the outside of the drive head assembly 76 is spaced from the frame 208 and guide member 210°. It is driven smoothly on roller bearings 304, 306 located in bore 308 on each side of a drive head base 310. The clamp assemblies 244, 246 and 212, 214 are fastened to the drive head base 310 by spaced head screws 312, 314. Each of the slide rods 204, 206 is supported on the cartridge frame 208 and guide 210 at spaced bores 316, 318 therein. The bores 316 are dimensioned to assemble the rods 204, 206. A set screw 320 secures each of the assembled rods in a fixed axial placement on the frame. Alignment of the base 310 is established by base bushings 322 in bores 324 which mate with housing pins 326. Head screws 328 secure the housing 270 for clamp assemblies 262, 264 to the guide member 210.

The cartridge 50 also includes a dielectric conduit 330 coupled at one end by fitting assembly 332 to the cartridge port 168 and coupled at its opposite end by fitting assembly 334 to the outboard cover 336 on guide plate 210 held in place on cartridge 50 by screws 338. Dielectric from fitting assembly 334 is directed through the guide member 210 to flow from an interior passage 339 across the guided electrodes.

The cartridge 50 in the illustrated embodiment has a check master assembly 340 for setting electrode length during the electrode refeed operation. It includes side arms 342, 344 each with an end 346 supported on a pivot pin 348 on either side of the guide member 210. The arms 342, 344 each have a horizontal reach 350 joined by a pin 352 that supports a gage ring 354. A wound spring 356 on each pivot pin 348 has one end grounded to guide member 210 and its opposite end connected to a tab 358 on each arm 342, 344 whereby the ring 354 will be positioned to engage a gage strip 360 located at each support station 52, 54 on the turrets 38, 40. When the check master assembly 340 is in the position of FIG. 1A it guards the electrodes 242 that extend from the cartridges 50 mounted on the turrets. During EDM operation the check master assembly 320 swings to an open position in which the ends of the electrodes 242 can be moved with respect to the workpiece.

In accordance with another aspect of the invention, an electrode magazine board 362 is connected to the drive base 310 and cantilevered therefrom through a rectangular slot 364 in the cartridge frame 208. The side walls 366, 368 of board 362 are spaced from the interior walls 370, 372 of frame 208 and the inboard surface 374 of board 362 is spaced from the floor 376 of frame 208. Consequently, the board 362 reciprocates without frictional engagement with the frame 208.

The magazine board 362 has a plurality of truncated V-sectioned slots 378, each carrying one of the electrodes 242 of preselected diameter. The slots 378 each have a sufficient depth to slidingly support the electrode 242 therein without contacting a cartridge cover 380 as shown in FIG. 16.

The board 362 has two recesses 382, 384 that contain resilient polymeric pads 386, 388, respectively. The outboard surfaces 390, 392 of pads 386, 388 are raised with respect to the outboard surface 374 of the board such that the pads 386, 388 will resiliently capture the electrodes 242 when the bridges 194, 196 are applied thereagainst.

The pads 386, 388 have chamfered leading and trailing edges 394, 396; 398, 400, respectively. The leading edge 402 to each guide slot is also chamfered.

Figure 20:
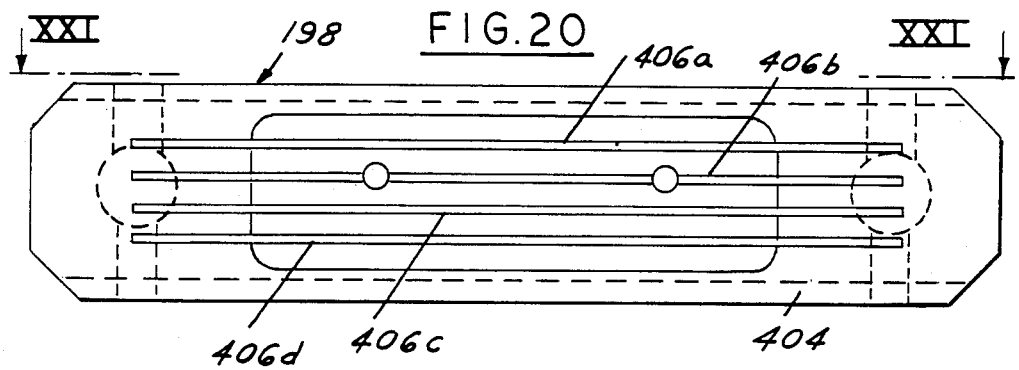
FIG. 20 is a bottom view of an electrode contact housing in FIG. 15.
Figure 21:
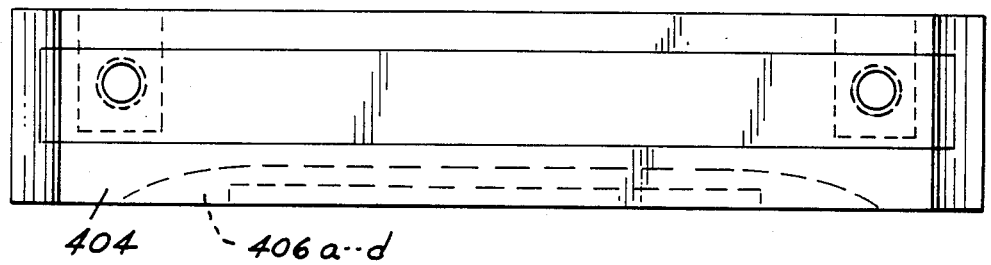
FIG. 21 is an elevational view taken along the line 21—21 of FIG. 20.
Figure 21A:
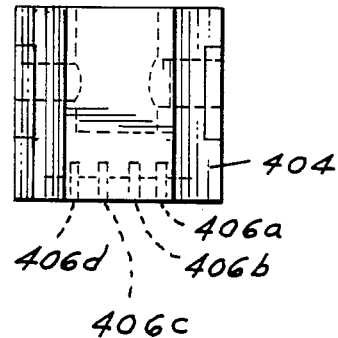
FIG. 21A is an end view of the housing in FIG. 15.

The construction of the electrode power bridge 198 is illustrated in FIGS. 20, 21. It includes an electrically isulated support block 404 with a plurality of spaced parallel electrical conductors 406a-d that extend axially of all of the electrodes for supplying EDM current pulses to each of the electrodes 242 during the EDM operation.

The short electrode bridge 196 is shown in FIGS. 22-24. It includes an electrical insulating block 408 with spaced electrical conductors 410a-d embedded therein to contact electrodes 242 when the bridge 198 is actuated inwardly by clamps 244, 246. In the illustrated embodiment, conductor 410b is connected to a power lead 412; it contacts electrode 242a; conductor 410a contacts electrodes 242-b; conductor 3865c contacts electrodes 242b-c; etc.; and conductor 410 contacts electrode 242. The lead 414 is connected to a suitable detector circuit (not shown). By virtue of this configuration, the omission of any one of the electrodes 242 from the board will be detected and a resultant signal from a detector circuit can operate a power disconnect circuit.

In order to highlight the operation of the cartridge exchange system and refeed cartridge, only the operating modes related to cartridge exchange and electrode feed will be discussed, with it being understood that the indexable turrets can be controlled by suitable CNC controllers to provide cartridges with desired electrode types to an exchange station in FIG. 1A for transfer by the shuttle and slide assembly to the EDM work station of FIG. 1B.

EXCHANGE OPERATION

When a desired type of electrode is programmed for use on the machine, the controller will condition turret drive motors 416, 418 to index one or the other of the turrets 38, 40 to a position with one of its support stations 52a-f or 54-f at an exchange location. The shuttle slide assembly 48 is driven on the Z-axis to the upper exchange position; one or the other of the slides 92, 94 are driven by one of the cylinders 100, 102 to the dotted line exchange position in FIG. 5 to interlock the lockpins 142 to a turret supported cartridge 50. A cylinder 100, 102 is then retracted to return the slide to the EDM working position on the shuttle. The retraction of the cylinder 100 or 102 exerts sufficient force to overcome the attraction of the interlock magnets 70. The lock-pins 142 will couple the plug board 110 to the sealed air ports 188, 190, 192 and female terminal block on the refeed cartridge 50. Also, the connections to dielectric port 168 and air fitting 176 are made. The coupling of shuttle slide assembly and cartridge 50 is sensed by proximity switch sensors 170, 172. Their retraction is sensed by limit switches 416, 418. This conditions the Z-axis drive to move the support member 42 on the Z-axis slide track 44 to the down Z-axis position in FIG. 1B. In the down Z-axis position, the electrodes 242 are positioned to establish a spark gap with respect to the workpiece during the EDM operation.

The EDM operation includes energization of the electrodes 242 by the EDM power supply and operation of the EDM drive cylinder 108 to transfer drive to the cartridge 50 only through the moveable plug 114 and the receptacle and drive head assembly 76. One aspect of the invention is that during the EDM operation, only the receptacle and drive head assembly 76 and the attached electrode magazine board 362 are driven. The rest of the electrode refeed cartridge and shuttle slide assembly remains stationary on the Z-axis slide. Consequently, there is little inertia to be overcome so that the electrode position can be quickly adjusted to maintain spark gap conditions within closely held tolerance ranges.

During the EDM feed of the electrodes 242, the clamp assemblies 262, 264 are unclamped and the clamp assemblies 212, 214 are clamped tight against the electrodes 242 so that the power bridge 194 will supply power thereto from the EDM power supply.

REFEED

At the end of each EDM operation, the refeed cartridge is operated to compensate for prior electrode wear. During refeed, the EDM drive cylinder 108 is operated to slide the receptacle and drive head assembly 76 toward the inboard surface 298. At the same time, cylinders 212, 214, 260, 262, are unclamped as are the clamp cylinders 244, 246. At the end of this hitch stroke, the cylinders 262, 264 are clamped against segments of the electrodes 242 which extend from the magazine board 362 and the EDM cylinder 108 is conditioned to drive the receptacle and drive head assembly 76 in an opposite direction. During the refeed, the springs 240 in clamps 212, 214 act on the electrodes. Consequently, a length of each electrode is pulled from the magazine board 342. The clamps 262, 264 are then released and the clamps 212, 214 are clamped so that the electrodes 242 will be resiliently held by pad 386. The EDM cylinder 108 then advances the pulled-out electrode segments through the guide member 210. The hitch action may be repeated.

GAGE STEP

During both refeed and gaging, all the clamps are released and only the clamp force of spring 240 is imposed on the electrodes 240 during movement of the electrodes against the check master 340 assembly which is positioned to intercept the ends of the electrodes 242 during gaging. Each electrode is advanced until it contacts the check master assembly; then each electrode slides back on the magazine board 362 until all electrode lengths are established. Thereafter, the clamp assemblies are operated to shift the electrode sensing bridge 196 to determine if an electrode is in each of the magazine slots. If the electrodes are all sensed, the clamps 262, 264 are re-clamped and a new EDM operation is initiated.

REFEED CARTRIDGE REPLACEMENT

When all or none or more of the electrodes in magazine board have been consumed, the bridge 196 will sense its absence on the magazine board. The shuttle and slide assembly can then be operated to the Z-axis position to shift the used cartridge 50 to an open station on an indexable turret 38, 40. From this position the cartridge is manually removed and replaced by a new cartridge assembly with full electrode lengths therein.

The used cartridge can then be opened by removing its cover and sliding new electrodes into its support slots.

The aforedescribed EDM machine enables a wide range of electrode sizes to be flexibly selected for forming a wide range of holes in a workpiece. Further, each selected electrode size is driven by means of a single EDM cylinder and associated drive coupling components that will feed and refeed electrodes supported and driven on a low mass and inertia magazine board and drive head.

The embodiments of the invention in which an exclusive property or privilege is claimed are defined as follows:

1. In an electrical discharge machine having a base with a workpiece holding fixture adapted for holding a workpiece; frame means including an upright frame member mounted on said base; a support member slidably mounted on said upright frame member; a turret indexably mounted on said frame means; a plurality of spaced electrode refeed cartridge mounting stations on said turret the improvement comprising:
   each of said cartridge mounting stations including magnetic means and locator pins; refeed cartridge means including a frame having means thereon coacting with said magnetic means and locator pins to magnetically attract and removably support the frame at one of said stations; moveable slide shuttle means for overcoming the magnetic attraction between said frame and said magnetic means and for moving one of said refeed cartridge means between the turret and a workpiece; said slide shuttle means including an EDM drive cylinder fixed thereto for movement therewith and connector means driven by said EDM drive cylinder to move electrodes from said refeed cartridge means to spark erode a desired opening in the workpiece; a source of air and electricity; and coupling means for operatively disconnecting and connecting said source of air and electricity to said respective refeed cartridge means and said EOM drive cylinder and for alternately separating and then communicating air and electricity from said sources when refeed cartridge means are removed and replaced onto said turret.

2. In the electrical discharge machine of claim 1, an interlock coupling means including a cylinder and rod mounted on said slide shuttle means for movement therewith, an expandable and retractable lock means formed on an end of said rod, a coupling means for expanding said lock means to operatively connect a cartridge assembly to said slide shuttle means for movements with respect to said turret and a workpiece; said lock means having a retention force in excess of said magnet means whereby movement of said slide shuttle means will separate refeed cartridge means from said magnetic means on said turret when said lock means is engaged to a refeed cartridge means.

3. In the electrical discharge machine of claim 1, wherein two turrets are indexably mounted on said frame member; said slide shuttle means disposed therebetween and including oppositely facing plug boards; each of said plug boards having connector means moveable thereon for supplying power to said refeed cartridge means and each of said plug boards having a single EDM drive cylinder fixed thereto for driving the connector means relative to said plug boards to advance electrodes during both a spark erosion cycle and a refeed cycle.

4. In the electrical discharge machine of claim 1, said connector means having a terminal block on said slide shuttle means, a combination power receptacle and drivehead assembly on each of said refeed cartridge means selectively coupled to said terminal block, electrodes extending from said refeed cartridge means with respect to a workpiece, and means for energizing said electrodes to spark erode a hole in the workpiece.

5. In the electrical discharge machine of claim 1, said connector means having electrical contact means and air port means, said electrical contact means and air port means including means selectively connected and disconnected by reciprocation of said slide shuttle means relative to a turret for communication of a source of air under pressure with said refeed cartridge means and for electricaly connecting electrodes in said cartridge means with a power source.

6. In an electrical discharge machine having an electrode supported on an indexable turret which electrode is transferable to a servo drive head the improvement comprising: a refeed cartridge assembly including a frame, means on said frame including magnet means and guide holes, magnetic means and guide pins on the indexable turret for magnetically coupling said frame thereto at said magnet means and guide holes thereon; an electrode board on said frame having a plurality of spaced electrode grooves, each of said cartridge assemblies including a combination power receptacle and drive head connected to said board and slidably mounted on said frame for reciprocating said electrode board, and electrode guide on said frame; and at least one electrode extending from said board through said electrode guide; and plural clamps including at least one clamp on said drive head for moving said electrodes with respect to said electrode guide during electrode refeed and for moving said electrodes toward and away from the workpiece to spark erode a desired opening therein following the refeed operation.

7. An electrical discharge machine comprising a base frame with a workpiece holding fixture adapted for holding a workpiece; frame means including an upright frame member mounted on said base frame; a support member slidably mounted on said upright frame member; a turret indexably monted on said upright frame member; a plurality of spaced electrode refeed cartridge stations mounted on said turret, each of said cartridge stations including magnetic means and guide pins; refeed cartridge means including a base frame having means thereon coacting with said magnetic means and guide pins to form a magnetic attraction between the base frame and one of said stations; and slide shuttle means relatively moveable with respect to said turret and said workpiece holding fixture including means for engaging said base frame and holding it on said slide shuttle means with a retention force greater than that of said magnetic attraction whereby said refeed cartridge means can be separated from a turret and moved between the turret and a workpiece.

8. In the electrical discharge machine of claim 7, two turrets indexably mounted at space points on said frame member; said slide shutle means disposed therebetween including oppositely facing plug boards; each of said plug boards having connector means moveable thereon for supplying power to said refeed cartridge means and each of said plug boards having a single EDM drive cylinder fixed thereto for driving the connector means relative to said plug boards to advance electrodes during both a spark erosion cycle and a refeed cycle.

9. In the electrical discharge machine of claim 7, wherein there is a connector means having a terminal block on said slide shuttle means, a combination power receptacle and drivehead assembly on each of refeed cartridge means relatively moveable with respect to said base frame and selectively coupled to said terminal block in response to movement of said slide shuttle means, electrodes extending from said refeed cartridge with respect to a workpiece, and means for energizing said electrodes to spark erode a hole in the workpiece.

10. In the electrical discharge machine of claim 7, wherein there is a connector means on said slide shuttle means having electrical contact means and air port means, said electrical contact means and air port means being selectively connected and disconnected by reciprocation of said slide shuttle means for communication of a source of air under pressure with said refeed cartridge means and for electrically connecting electrodes in said cartridge means with a power source.

11. In the electrical discharge machine of claim 7, an interlock coupling means including a cylinder and rod mounted on said slide shuttle means for movement therewith, an expandable and retractable lock means formed on end of said rod; a coupling means for expanding said lock means to operatively connect a cartridge assembly to said slide shuttle means for movements with respect to said turret and a workpiece, said lock means having a retention force in excess of said magnet means whereby movement of said slide shuttle means will separate refeed cartridge means from said magnetic means on said turret when said lock means is engaged to a refeed cartridge means.

12. An electrical discharge machine comprising a base frame having secured thereon a workpiece holding fixture adapted to holding a workpiece; frame means including an upright frame member mounted on said base frame; a support member slidably mounted on said upright frame member; a turret indexably mounted on said frame means; a plurality of electrode refeed cartridges, interlock means removably mounting each of said cartridges on said turret, each of said cartridges including a frame secured to said turret by said interlock means, drive head means slidably mounted on said frame; an electrode guide board cantilevered from said drive head means and freely slidable without friction with respect to said frame for reducing the actuation force through said drive head means; at least one electrode slidably supported on said electrode guide board; means for moving said support member and turret; slide shuttle means relatively moveable with respect to said support member and selectively positioned in a cartridge exchange elevation at the turret and an EDM working location at the workpiece and drive means including an EDM cylinder means fixed on said slide shuttle means for driving at least one electrode into operational relationship with one workpiece to spark erode a desired opening therein.

13. In the combination of claim 12 said EDM cylinder means including a connector plug reciprocally mounted on said slide shuttle means, a power receptacle on each of said drive head means; said EDM cylinder having its cylinder rod secured to said connector plug for reciprocally moving said connector plug along a first axis; and second cylinder means for reciprocating said connector plug with respect to said power receptacle along a second axis transverse to the first axis to connect said drive head means to said EDM drive cylinder.

14. In the combination of claim 13, expandable means to secure said refeed cartridges to said slide shuttle means for movement with said shuttle means.

15. A refeed cartridge assembly for selectively compensating for electrode wear during a spark erosion process comprising:

a cartridge frame with an electrode guide on one end thereof, a pair of slide rods on said frame; a drive head slidably supported on said slide rods, an electrode magazine board on said drive head having a plurality of longitudinally directed electrode support grooves therein; means for fixedly securing said magazine board to said head for movement therewith and for spacing said board from said frame whereby relative movement between said board and said frame is frictionless; first electrode clamp means on said electrode guide; second electrode clamp means on said drive head; said second electrode clamp means engageable in opposite directions and including a neutral position; control means operative to release the first clamp means and engage the second clamp means in a first direction during an EDM operation in which said drive head moves said magazine board and electrodes thereon in a first direction with respect to said electrode guide bushing when the drive head is moved in a first direction; said control means being operative to release the first electrode clamp means and to condition the second electrode clamp means in neutral when said drive head is moved in a direction opposite to said first direction during a refeed movement wherein electrodes are drawn from said electrode board; said control means engaging said first electrode clamp means and engaging second the electrode clamp means in an opposite direction during a reverse refeed movement of said head; and means for imposing a controlled spring pressure on said electrode during said refeed movement to advance the electrodes through the electrode guide until a location pressure is imposed thereon at which time the electrodes are slidable against the controlled spring pressure relative to said electrode board.

16. In the combination of claim 15, said spring pressure being established by spaced polymeric pads at one end of said board engageable with electrodes slidably supported in said grooves and means including a bridge element held against the electrodes opposite to said pads.

17. In the combination of claim 15, said drive head having first pressurizable piston means therein; a bridge carried by said piston means in an electrically insulated housing with a plurality of spaced electrical conductors embedded therein; each of said conductors adapted to bridge one or more of said electrode grooves and to be engageable with an electrode supported therein; and means for applying power to one of said conductors and ground to another of said conductors; and means for sensing the presence of electrodes in all of the grooves only by uninterrupted series current flow through alternate conductors and electrode segments in all of the grooves.

18. In the combination of claim 15, said spring pressure being established by spaced polymeric pads at one end of said board engageable with electrodes slidably supported in said grooves; means including a bridge element held against the electrodes opposite to said pads, said drive head having first pressurizable piston means therein; a bridge carried by said piston means including an electrically insulted housing with a plurality of spaced electrical conductors embedded therein, each of said conductors adapted to bridge one or more of said electrode grooves and to be engageable with an electrode supported therein; means for applying power to one of said conductors and ground to another of said conductors; and means for sensing the presence of electrodes in all of the grooves only by uninterrupted series current flow through alternate conductors and electrode segments in all of the grooves.

19. In an electrical discharge machine having a base with a workpiece holding fixture adapted for holding a workpiece; frame means including an upright frame member mounted on said base; a support member slidably mounted on said upright frame member, a turret indexably mounted on said frame member; a plurality of spaced refeed cartridge stations on said turret the improvement comprising: each of said cartridge stations including magnetic means and locator pins; refeed cartridge means including a frame having means thereon coacting with said magnetic means and said locator pins to magnetically attract and removably support the frame at one said refeed cartridge stations; and slide shuttle means moveable independently of said turret for overcoming the magnetic attraction between said frame and said magnetic means for separating one of said refeed cartridge means from the turret and for moving one of said refeed cartridge means between the turret and the workpiece.

20. In an electrical discharge machine having a base with a workpiece holding fixture adapted for holding a workpiece; frame means including an upright frame member mounted on said base; a support member slidably mounted on said upright frame member; a turret indexably mounted on said frame means; a plurality of spaced electrode refeed cartridge stations mounted on said turret the improvement comprising: each of said cartridge stations including magnetic means and locator pins; refeed cartridge means including a frame having means thereon coacting with said magnetic means and said locator means to magnetically attract and removably support the frame at one of said stations; moveable slide shuttle means operable independently of said turret for overcoming the magnetic attraction between said frame and said magnetic means and for moving one of said refeed cartridge means between the turret and a workpiece; said slide shuttle means including an EDM drive cylinder fixed thereto for movement therewith 21. In the electrical discharge machine of claim 20, means including selectively energized clamp means for compensating for electrode wear, said EDM drive cylinder being operable to move an electrode when said clamp means are positioned in a refeed mode so as to compensate electrode wear.

* * * * *